PAUL LIPPKE
INVENTOR.

BY Karl F. Ross
AGENT

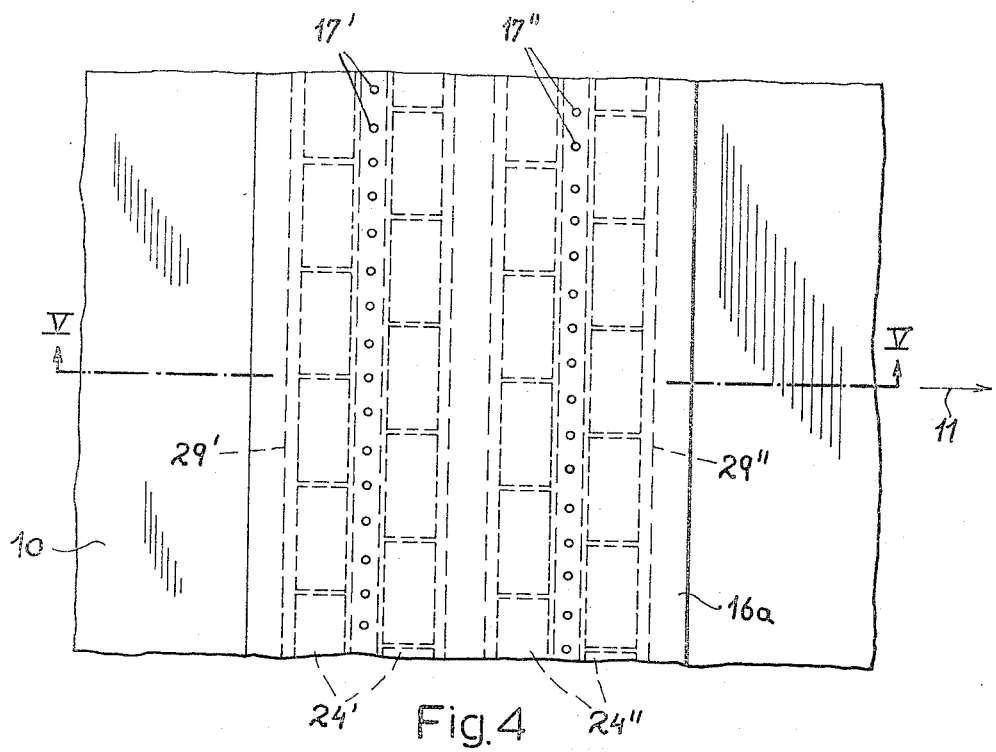
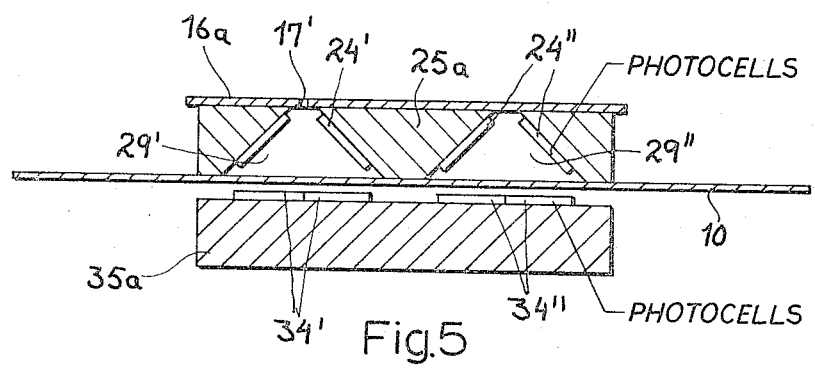

July 18, 1967 P. LIPPKE 3,331,963
APPARATUS FOR OPTICALLY DETECTING FLAWS IN SHEET MATERIAL
Filed April 20, 1964 6 Sheets-Sheet 4

PAUL LIPPKE
INVENTOR.

BY Karl G. Ross
AGENT

PAUL LIPPKE
INVENTOR.

BY Karl F. Ross
AGENT

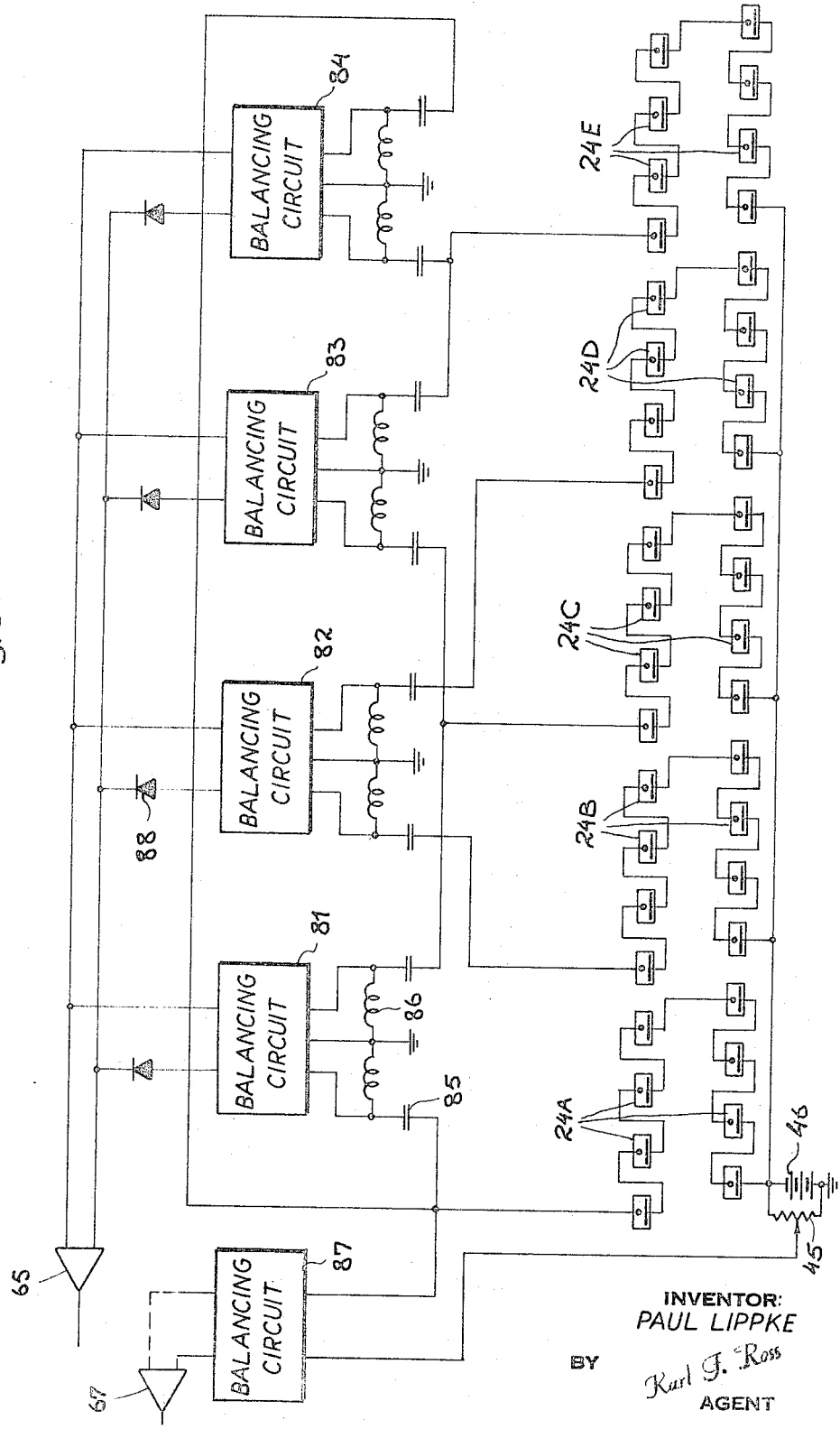

3,331,963
APPARATUS FOR OPTICALLY DETECTING
       FLAWS IN SHEET MATERIAL
     Paul Lippke, Augustastrasse 17,
        Neuwied (Rhine), Germany
    Filed Apr. 20, 1964, Ser. No. 361,304
Claims priority, application Germany, Apr. 23, 1963,
                L 44,711
         19 Claims. (Cl. 250—219)

ABSTRACT OF THE DISCLOSURE

Apparatus for detecting holes, cracks and other optically detectable imperfections in a sheet of paper or other material which includes a light source in the form of a fluorescent tube extending across the sheet material, and an array of photocells in a parallel line at a location spaced from the light source. A continuously perforated endless band is displaced between the light source and the photocells so that the light beams are confined to individual spots as they pass through the band and continuously sweep across the sheet with the movement of the band.

---

My present invention relates to apparatus for detecting optically ascertainable imperfections on sheet material by scanning such material, either episcopically or with translumination, as it travels past a given location either in the form of a continuous web or as a succession of sheets of limited length.

Heretofore, the scanning of the sheet material in such apparatus was carried out with the aid of a single beam of light which repetitively swept across its path at a rate that was very high in comparison with the speed of sheet travel. This was necessary by reason of the fact that the beam, in order to detect pinholes, dark spots or other imperfections limited to a small area, had to be sharpened to a fine pencil of light—e.g. of a cross-sectional area of the order of 1 mm.$^2$—at the point where it fell upon the paper, cardboard, sheet metal or other material to be tested. With sheets of considerable width (e.g. of one or two meters) advancing at a reasonably fast rate (as, for example, 5 meters per second) it was, therefore, essential to have available a scanning system which could pass defect-indicating pulses with a duration on the order of $10^{-7}$ second, i.e. whose output stage would be operative in a frequency range up to about 10 megacycles per second. Even so, conventional systems often failed to respond properly to certain kinds of defects, such as creases or lines extending transversely (in the direction of scan) across the sheet. Finally, focusing of a beam from a single light source along its entire track upon the sheet surface called for light paths of considerable length, at least in the case of wide sheets.

The general object of this invention is to provide an improved sheet-testing system of the character referred to which furnishes reliable defect indication with greatly reduced scanning speed, thus permitting the use of simplified electrical equipment.

A more particular object of my invention is to provide a system of this type responsive to all kinds of defects, including transversely extending faults, so as to indicate them in a reliable manner even in the presence of large-area color variations or other irregularities which would tend to raise the response threshold or increase the background noise in known devices of this character.

It is also an object of the instant invention to provide means in such system for substantially equalizing the length of the ray paths of the scanner throughout the width of the sheet material to be tested, thereby simplifying the task of keeping the beam focused upon the sheet surface.

An important feature of my invention resides in the provision of an optical scanner including one or more light sources adapted to produce a flat bundle of light rays across the sheet path, the scanner further comprising beam-forming means for concentrating these light rays (or at least those portions thereof that are not absorbed by the test material, i.e. that are either transmitted through it or reflected from its surface) into a multiplicity of small spots lying in one or more rows across the sheet path, the beam-forming means being displaceable so as to move these spots with invariable relative spacing across that path. It will be apparent that, with such an arrangement, the sheet surface can be fully scanned if each spot is moved only into the position of the next spot during the time required by the sheet to advance by the width of a light spot (say, 1 mm.), hence the scanning speed should be related to the rate of sheet motion substantially by the ratio $s/n:w$ where $s$ is the length of the scanning path (or sheet width), $n$ is the number of light spots in a row and $w$ is the width of the spot. The quotient $s/n$ represents, of course, the separation between adjoining light spots in the scanning direcetion. Thus, with a sheet width of, for example, 1600 mm. and a sheet speed of 10 m./sec., a scanner producing a row of 320 light spots each 1 mm.$^2$ in area (such as circular spots with a diameter of about 1.125 mm.) need only operate at a rate of 50 m./sec., each light spot being thus able to detect up to 25,000 knots, holes and/or blemishes per second inasmuch as the minimum spacing of separately identifiable defects is assumed to be 1 mm. The output circuit of the scanner, therefore, need only comprise low-frequency amplifying and discriminating equipment even though, in a subsequent stage of the system, it may be convenient to modulate the detected pulses upon a high-frequency carrier for further handling. These pulses may be used immediately, e.g. for visual indication of the ascertained defects, or may be temporarily stored so as to be available at a control point where the defective material is specially marked or eliminated, as for instance with the aid of automatic baffles in a manner known per se from U.S. Patents Nos. 3,023,900 and 3,061,731.

With such a system it is possible, if the light spots are arranged in two parallel rows, to compare the outputs of two scanners separately trained upon these rows in order to obtain defect-indicating signal pulses not only in response to variations of light transmissivity and/or reflectivity along each row, i.e. transversely to the sheet, but also as between the two rows, thus in longitudinal direction of the travel path of the material under test. The output voltage of the scanning system may also be compared with a predetermined reference potential, advantageously of a magnitude corresponding to the output level of the scanner upon the testing of a sheet free from imperfections, in order to indicate large-scale departures from the norm (including, for example, transverse streaks or creases).

As long as the number of light spots is relatively small, all the rays transmitted through or reflected from the sheet material may be intercepted by a single receiving device such as a rod of glass, or other light-conducting substance, extending completely across the width of the sheet path. With such a parallel collection of light rays, however, the sensitivity of the system is rather limited since a black or opaque region detected by a single scanning beam, among a total of $n$ beams, will reduce the total quantity of received light by, at most, a factor $(n-1)/n$ (assuming total absorption), this factor approaching unity with increasing values of $n$. A preferred mode of collection, therefore, involves the use of a plurality of photoelectric receivers or cells each positioned to receive light from only a small group of spots, these cells being all connected in series so that the conductivity of the entire chain can be no greater than that of the cell receiving the smallest amount of illumination whereby the sensitivity of the system is $1/m$ times that of an individual photocell, $m$ being the number of light spots assigned to each cell and being preferably not greater than about three or four.

According to a more particular feature of this invention, I employ as the aforementioned beam-forming means a masking element of suitable configuration interposed between the light source or sources and the sheet surface. This masking element may take the form of an endless perforated band encircling the sheet and moving in a direction perpendicular to the direction of sheet travel, the band being advantageously separated from the sheet by a fixed support having a channel aligned with the perforations of the band and an array of photocells, cascaded in the manner described above, disposed in that channel adjacent the side of the sheet facing the band (for episcopic testing) or adjacent the opposite sheet surface (for testing by translumination). For the simultaneous testing of both sheet surfaces, by reflected and/or transmitted light rays, the band may be in the form of a loop having two reaches approaching close to the sheet from opposite sides. The perforations of the band may be arrayed in two adjacent rows for the illumination of two sets of photocells connected in separate series circuits whose outputs are fed into a common evaluating stage of the scanner; if the perforations of the two rows are relatively staggered, complete testing of the sheet surface may be carried out with half the scanning speed or double the rate of sheet travel.

Regardless of the number of rows of perforations employed, the totality of photocells may be divided into several groups (preferably an even number) each connected in a separate series circuit, the output voltages of the several series circuits being then compared to produce a difference signal indicative of an irregularity.

The light rays used for testing may originate at a linear lamp or array of lamps extending parallel to the sheet surface and to the perforated band whereby the light beams defined by the perforations in the band are all of substantially the same length which, moreover, will not vary materially as the band moves across the sheet, hence no modulation of the scanner output related to the sweep of the beams will take place. This eliminates one of the inconveniences of prior-art devices of this general type.

The invention will be described in greater detail with reference to the accompanying drawing in which:

FIG. 4 is a top plan view of part of the system of FIGS. 2 and 3, drawn to a larger scale;

FIG. 5 is a cross-sectional view taken on the line V—V of FIG. 4;

FIGS. 8 and 9 illustrate two circuit arrangements for an apparatus according to the invention.

Figure 1:
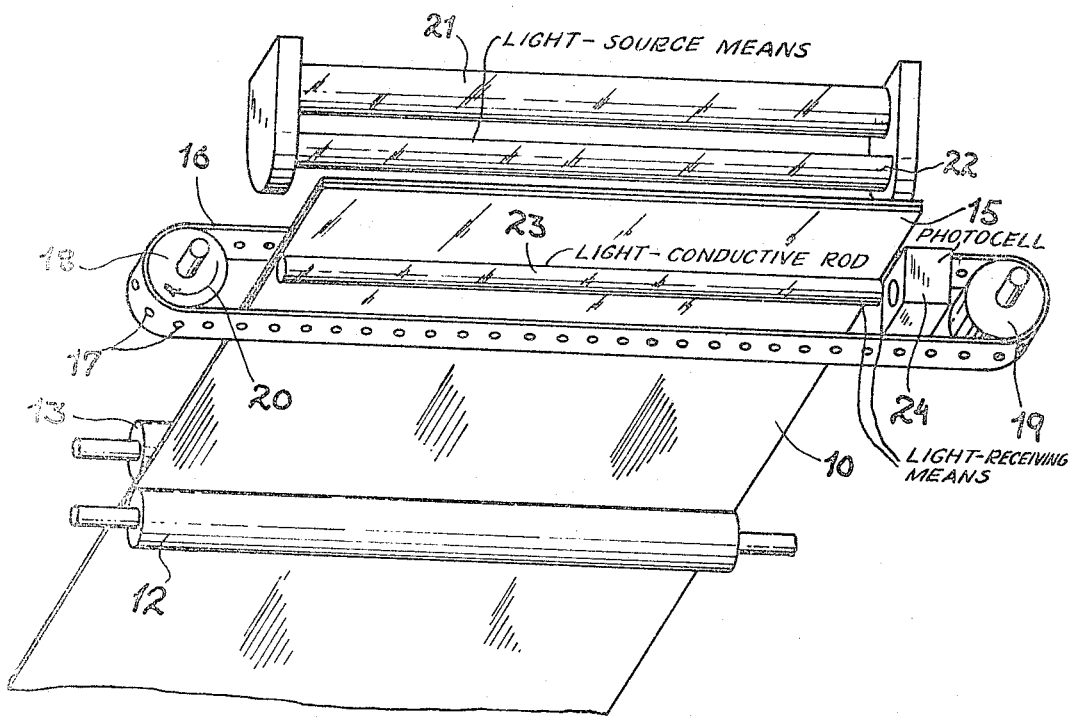
FIG. 1 is a perspective view of a scanning system for the testing of sheet material in accordance with my invention.

In FIG. 1 I have shown part of an apparatus for testing a sheet 10, e.g. of paper, as it travels at constant speed along a path indicated by arrow 11. The sheet 10, which may be part of a continuous web or may be one of a series of individual sheets following one another in close succession, is advanced along its path by one or more pairs of feed rollers 12, 13 and rests on horizontal supporting means not further illustrated except for a glass plate 15. An endless band 16, having a row of equispaced perforations 17, extends transversely to the travel direction 11 and encircles the sheet 10; this band is supported by a pair of rollers 18, 19 of which at least one is driven to rotate the band at constant speed as indicated by arrow 20.

An elongated source of light 21 horizontally overlies the sheet 10, parallel to the band 16, and illuminates it via a focusing system schematically represented as a cylindrical lens 22. Aligned with this light source, and parallel thereto, is a glass rod 23 disposed below the plate 15 to receive light rays radiated from the lamp 21 through the perforations on the upper reach of band 16 onto and through the sheet 10. The lens 22 focuses these light rays onto a transverse line registering with the perforations 17 which divide the flat beam produced by the lens into a multiplicity of equispaced pencils of light moving constantly across the advancing sheet 10, thereby forming a series of traveling light spots whose width is a fraction of their separation. To extent that the rays concentrated upon these light spots are not absorbed by the sheet material, they impinge upon the glass rod 23 which pipes the received light to a photocell 24 facing one of its ends; the opposite end of the rod as well as its underside may be provided with an opaque, internally reflecting coating. The output of photocell 24, which decreases in magnitude whenever any of the beams formed by the perforations 17 is intercepted by a knot or other optically denser portion of sheet material, is fed to a suitable indicator or other utilization device not shown. It will be apparent, therefore, that the amplitude of the pulse generated by a drop in output voltage will depend upon the number of beams concurrently suppressed, as well as upon the degree of opacity of the tested sheet region, and that the duration of such pulse is determined by the transverse extent of the irregularity whereas the number of repetitions of the pulse indicates its extent in the longitudinal direction; thus, the integrated value of the pulses over a given test interval may be taken as a criterion for the acceptance or rejection of the sheet. Rod 23 and cell 24 may, of course, be shielded from direct illumination by means not shown.

Figure 2:
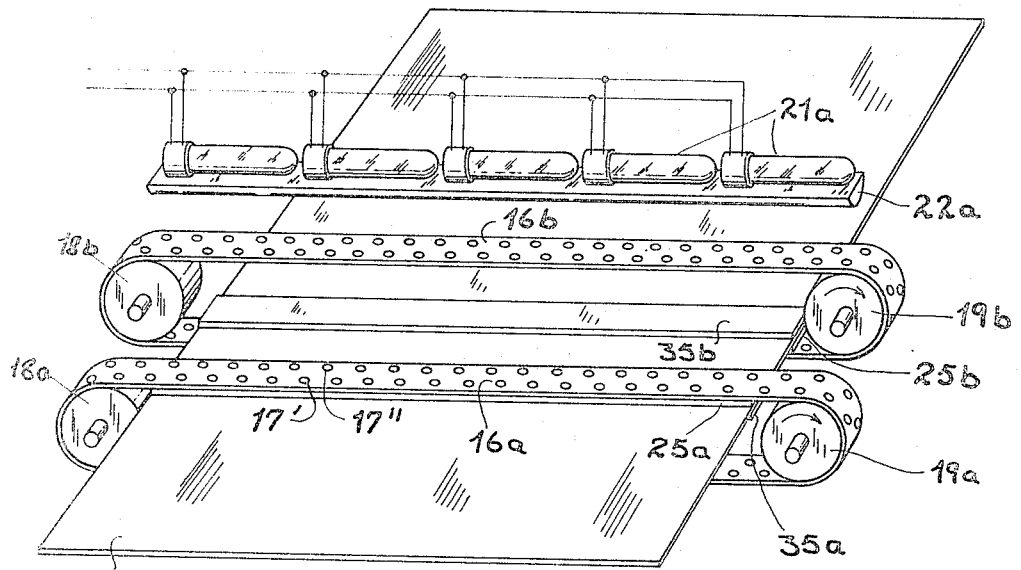
FIG. 2 is a view similar to FIG. 1, showing a modified scanning system.

The system shown in FIG. 2 is generally similar to the one just described, except that two bands 16a, 16b looped around axially offset roller pairs 18a, 19a and 18b, 19b are used to scan the sheet 10 from opposite sides. The bands 16a, 16b are identical and are each provided with two rows of relatively staggered perforations 17′, 17″. Two light sources are provided, i.e. a linear array of lamps 21a above the sheet for the band 16a and a similar array 21b (not shown in FIG. 2 but illustrated in FIG. 3) below the sheet. The cylindrical lens 22a forms part of an optical system shown in greater detail in FIG. 3. The operative reaches of the bands, i.e. the upper reach of band 16a and the lower reach of band 16b, rest against elongated horizontal supports 25a, 25b which accommodate the photoelectric receivers in a manner more fully described hereinafter with reference to FIGS. 4 and 5.

Figure 3:
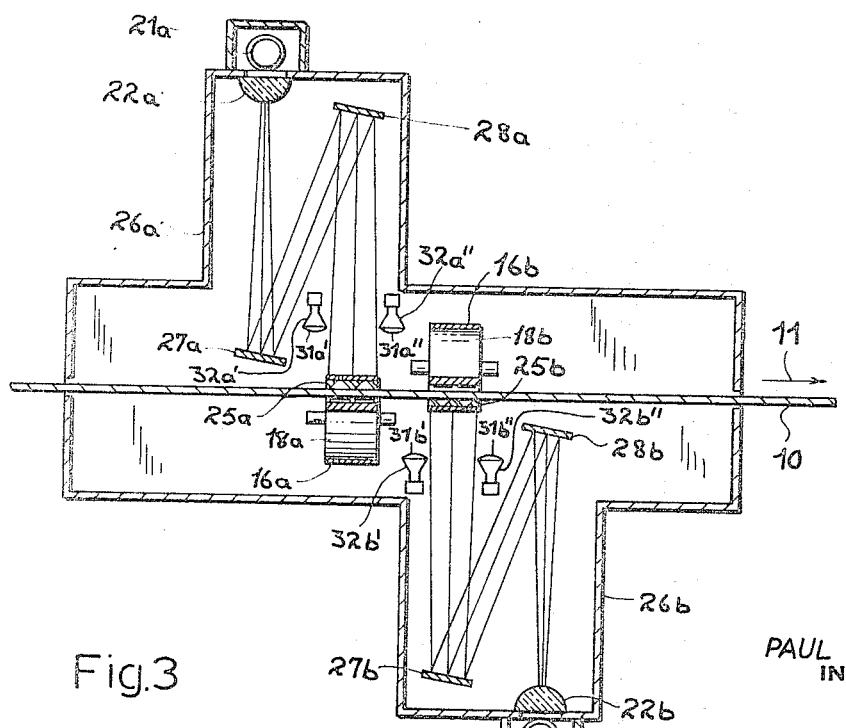
FIG. 3 is a cross-sectional view of an apparatus incorporating the system of FIG. 2.

FIG. 3 shows the system of FIG. 2 enclosed by an opaque housing 26 which is also illustrative of a suitable enclosure for the system of FIG. 1. This housing is laterally slotted to allow for the entry and exit of sheet 10, moving in the direction of arrow 11, and has extensions 26a, 26b which carry the light sources 21a, 21b and provide room for the beam-forming assemblies associated therewith. These assemblies include, in addition to the lens 22a, a pair of reflectors 27a, 28a in housing extension 26a and a similar pair of reflectors 27b, 28b together with a cylindrical lens 22b in housing extension 26b. The lenses 22a, 22b are so designed that the flat bundle of light rays emitted by the corresponding light source 21a or 21b diverges slightly, in the plane of sheet travel, on its way to the perforated band 16a or 16b so as to span both sets of perforations 17', 17" thereof; in order to keep the rays nearly parallel, so as to prevent appreciable divergence between the perforations and the sheet surface, the ray path must be relatively long wherefore the mirrors 27a, 28a and 27b, 28b are provided.

FIGS. 4 and 5 show the manner in which two sets of photocells 24' and 24" are arrayed in parallel rows on the support 25a so as to flank the rows of perforations 17', 17" of the band 16a; this arrangement is, of course, also representative of the receiving system associated with support 25b (FIGS. 2 and 3). The support is formed with two upwardly open longitudinal channels 29' and 29", of generally triangular cross-section, whose inclined sides carry the photocells 24' and 24". These cells, as seen in FIG. 4, are elongated in the direction of band motion and register each with three perforations at a time, the cells on opposite sides of the row of perforations being relatively staggered so that their periods of illumination by light from a given perforation overlap. As each photocell receives simultaneously the scattered reflections from three pencils of light, suppression of any one pencil upon the scanning of a dark spot, crease or pinhole will reduce by substantially one-third the quantity of radiant energy impinging upon the cell. If the cell has a linear characteristic, this reduction will result in a proportional increase in its electrical resistance which approaches infinity when all impinging radiation disappears; it is, however, also possible to utilize a nonlinear cell characteristic whereby suppression of the first light spot causes a sharper rise in resistance than the elimination of each further light spot.

In FIG. 5 I have also shown two additional sets of photocells, 34', 34" illuminable by radiation which penetrates the sheet 10. The cells 34', 34" are carried on an elongated support 35a, coextensive with support 25a but located adjacent the opposite sheet surface, and may be arrayed in substantially the same manner as the cells 24', 24". Although the photocells 34', 34" on support 35a, along with a similar assembly of photocells on another support 35b (FIGS. 2 and 3) opposite support 25b, could be irradiated by light sources 21a and 21b, respectively, I have shown in FIG. 3 a special set of lamps 31a', 31a" and 31b', 31b" for this purpose. The radiation emitted by these lamps may be focused upon the perforations 17', 17" by suitable means here shown as reflectors 32a', 32a" and 32b', 32b"; it is of no consequence that the beams produced by the lamps 31a', 31a", and 31b', 31b" may converge upon areas of the sheet 10 different from those receiving the rays from lamps 21a and 21b.

Advantageously, the light sources 31a etc. may emit radiation of a wavelength different from that emitted by the light sources 21a, 21b, e.g. in the infrared rather than the visible band of the spectrum for easier penetration of the sheet material, the respective photocells being then designed to respond preferentially to the emission wavelengths of the respective sources. Furthermore, the output voltages of photocells 24', 24" and 34', 34" may be differently weighted (if fed to a common evaluating stage) by different degrees of amplification.

Figure 7:
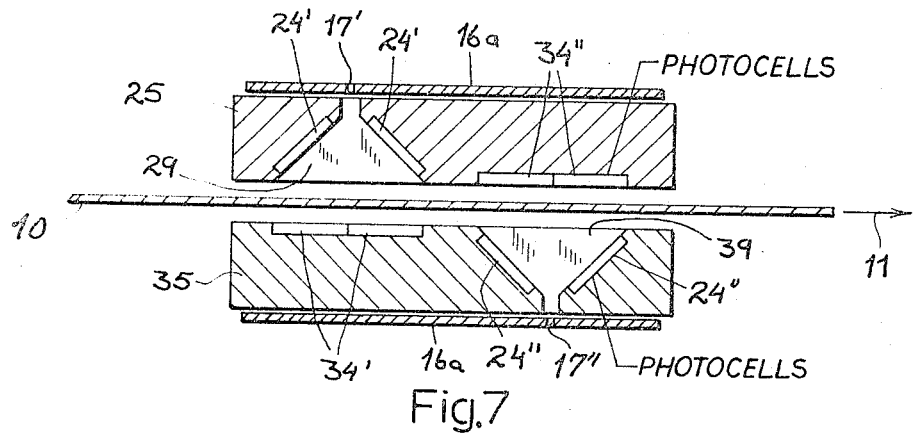
FIG. 7 is an enlarged cross-sectional view taken on the line VII—VII of FIG. 6.
Figure 6:
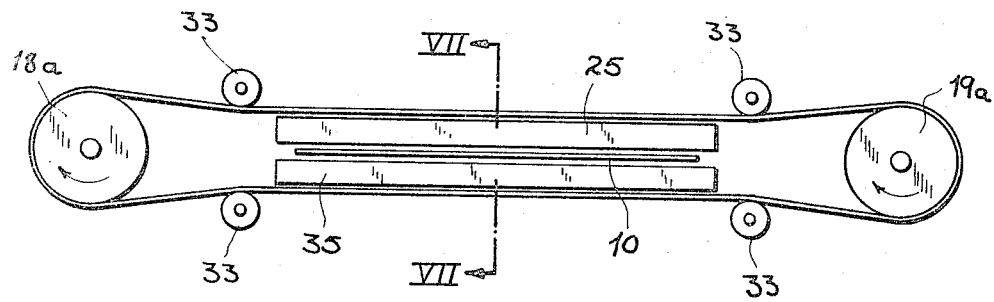
FIG. 6 is a side-elevational view of still another scanner embodying the invention.

In FIGS. 6 and 7 I have illustrated a modified scanning arrangement with two identical but relatively inverted photocell supports 25, 35 disposed on opposite sides of the sheet 10. The band 16a is guided by additional idler rollers 33 in such manner that its upper and lower reaches lie flat against these supports. The latter are each provided with an outwardly open channel 29 of triangular profile aligned with a respective row of perforations 17' or 17". Support 25 carries one set of photocells 24' to test the upper sheet surface by reflected light rays from perforations 17', these cells being arrayed as before in the channel 29, alongside a set of photocells 34" which are aligned with the perforations 17" so as to be illuminated by penetrating rays from the opposite side of the sheet. In analogous manner, the circuit 35 accommodates photocells 24" in its channel 39 for episcopic testing by way of perforations 17" and photocells 34' for testing by translumination from perforations 17'. The associated light sources and housing may be as described in conjunction with FIG. 3 and have not been illustrated.

Figure 8:
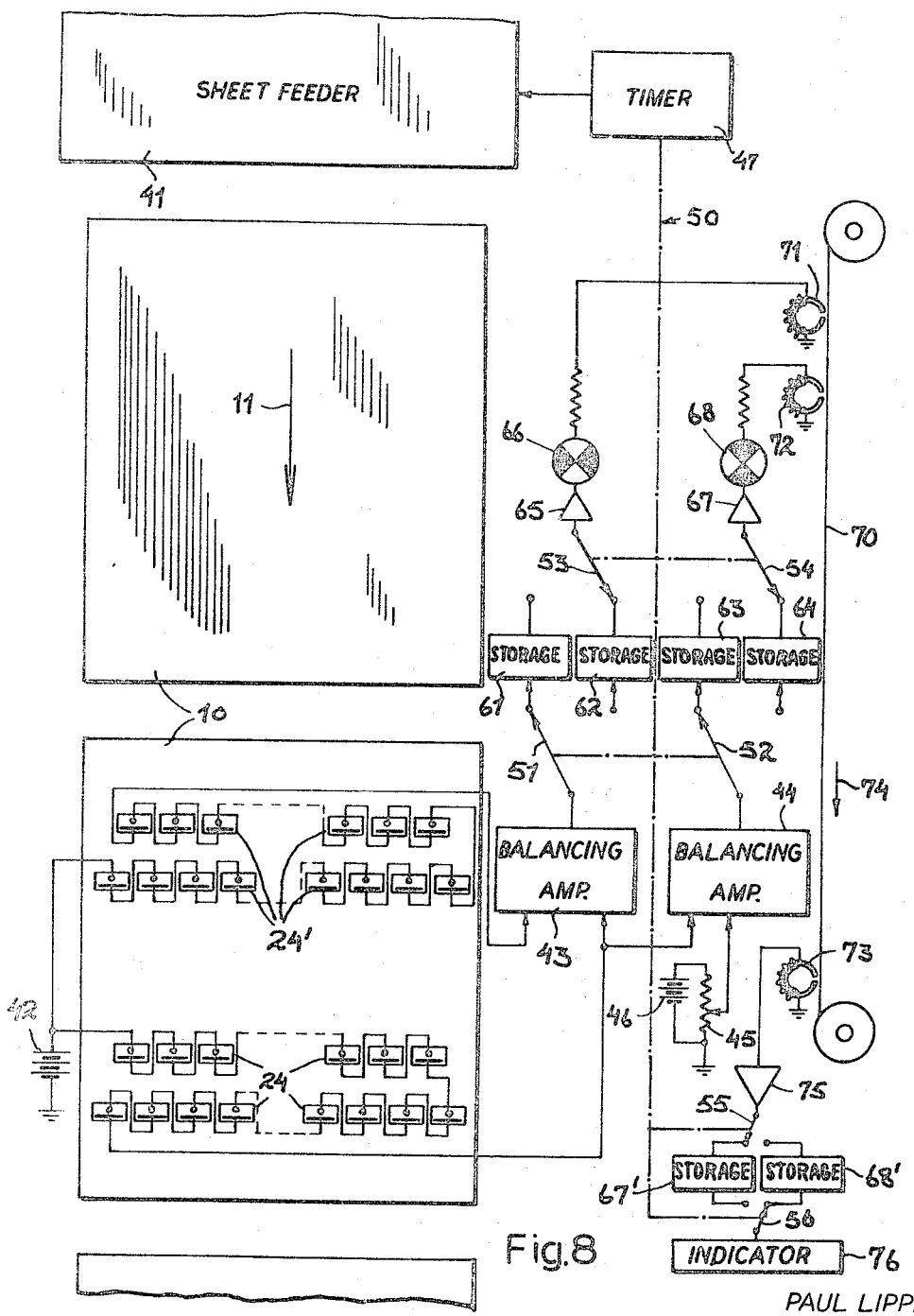

In FIG. 8 I have shown diagrammatically a complete system for the testing of a succession of sheets 10 in accordance with my invention. The sheets 10 are delivered by a feeder 41, e.g. in the maner described in the aforementioned U.S. Patent No. 3,023,900, and travel in the direction of arrow 11 past a testing station here represented by two sets of photocells 24', 24". It will be understood that these photocells may be physically arranged in any of the ways described in conjunction with FIGS. 2–7 and that they may be illuminated by reflected and/or penetrating light rays.

The cells 24' and 24" are connected in two series circuits energized in parallel from a source of current schematically represented by a battery 42. The output voltages of the two series circuits are applied to a balancing amplifier 43 which compares their magnitudes and produces a signal in response to any voltage difference. A second balancing amplifier 44 receives the output voltage of the series-connected cells 24" and compares it with a reference potential from an adjustable voltage selector here shown as a potentiometer 45 connected across a battery 46.

A timer 47 controls the sheet feeder 41 and operates, in step therewith, a switch 50 having two pairs of armatures 51, 52 and 53, 54 as well as two further armatures 55 and 56. Armature 51, connected to the output of balancing amplifier 43, applies the defect-indicating difference signals thereof alternately to two storage circuits 61, 62 in which the signal pulses occurring during passage of a single sheet 10 are accumulated; a charge corresponding to the integrated value of these pulses is then transmitted by armature 53 to a recording head 71 by way of an amplifier 65 and an interrupter 66 which, in chopping the discharge current from the capacitive storage circuit 61 or 62, produces a high-frequency carrier of an amplitude determined by the magnitude of the stored charge whereby a signal of corresponding intensity is recorded on a magnetic tape 70 moving in the direction of arrow 74. Armature 52, in like manner, distributes the output of balancing amplifier 44 onto a pair of storage circuits 63, 64 whence it is picked up by armature 54 and impressed upon the tape 70 by a recording head 72 which is energized through another amplifier 67 and high-speed interrupter 68. After a suitable delay, designed to let the tested sheet 10 arrive at a control point, a reading head 73 picks up the signals stored on tape 70 and delivers them via an amplifier 75 and armature 55 to either of two storage circuits 67', 68' from which, in the next timer cycle, they are transferred by armature 56 to an indicator 76. This indicator, not shown in detail, may comprise means for shunting defective sheets (i.e. those for which the recorded signals exceed a certain threshold amplitude) onto a reject pile, as also known per se from U.S. Patents Nos. 3,023,900 and 3,061,731. If desired, the timer 47 may be set to operate the switch 50 more than once per cycle, e.g. for the purpose of detecting defective front and rear halves of respective sheets in order to direct such sheets onto two different piles as also taught in the aforementioned U.S. patents. If the system were used to test a continuous web, the indicator 76 could simply bring defective portions to the attention of an operator or register them on a control strip.

FIG. 9 shows a modified overall system with a single set of photocells, forming two relatively staggered rows, subdivided into several groups of series-connected cells 24A, 24B, 24C, 24D and 24E. A network for comparing the individual output voltages of these series circuits comprises four balancing circuits 81, 82, 83 and 84 each connected to two nonadjacent circuits, i.e. to the circuits of cells 24A and 24C in the case of balancer 81 and to the circuits of cells 24A and 24E in the case of balancer 84, with balancers 82 and 83 respectively connected to cells 24B, 24D and to cells 24C, 24E. This separation of the cell groups assigned to a common comparison circuit insures that a signal will also be produced whenever a defect crosses the boundary between adjacent groups.

The input leads of the balancing circuits 81–84 include high-pass filters, here shown as composed of series condensers 85 and shunt inductances 86, designed to make this comparator more sensitive to short pulses resulting from irregularities of limited extent, the existence of large defective areas being ascertained by a separate balancing circuit 87 which compares the output of photocell group 24A with a constant potential derived from the adjustable source 45, 46. The output of balancing amplifier 87 is delivered to an indicator and control stage, such as the one shown in FIG. 8, via amplifier 67; the companion amplifier 65 receives the output pulses of balancing circuits 81–84 which are connected thereto in parallel through respective isolating diodes 88. It will be understood that the input circuit of amplifiers 65 and 67 may again include switching and storage means as described in conjunction with FIG. 8.

The embodiments described above and illustrated in the drawing are, of course, susceptible of numerous modifications without departing from the spirit and scope of my invention as defined in the appended claims.

I claim:

1. An apparatus for detecting optically ascertainable imperfections on sheet material, comprising light-source means adapted to produce a flat bundle of light rays across a path of sheet material to be tested, feed means for advancing said sheet material along said path with interception of said bundle by successive sheet portions, light-receiving means disposed along a line transverse to said path for illumination by unabsorbed light rays of the intercepted bundle, an endless perforated band disposed between said light-source means and said light-receiving means for confining said unabsorbed rays to a multiplicity of small spots lying in at least one row across said path, drive means for displacing said band to sweep said spots with invariable relative spacing across said path at a rate related to the speed of said sheet material by a ratio substantially corresponding to the ratio of the separation between adjoining spots to the width of said spots whereby the entire sheet surface is scanned by light rays directed toward said light-receiving means, and defect-indicating means responsive to the output of said light-receiving means.

2. An apparatus as defined in claim 1 wherein said light-receiving means comprises a rod of light-conducting material extending across said path and photoelectric means disposed for illumination by an end of said rod.

3. An apparatus as defined in claim 1 wherein said light-receiving means comprises a set of juxtaposed photoelectric cells.

4. An apparatus as defined in claim 3 wherein each of said cells is positioned to receive light simultaneously from a limited number of adjacent spots.

5. An apparatus as defined in claim 4 wherein said cells are arranged in staggered relationship in two adjacent rows.

6. An apparatus as defined in claim 3 wherein said cells are linked together in at least one series circuit connected to said defect-indicating means.

7. An apparatus as defined in claim 6 wherein said defect-indicating means includes circuit means for comparing an output voltage from said series circuit with a predetermined reference potential.

8. An apparatus as defined in claim 6 wherein said cells are interconnected in a plurality of series circuits and said defect-indicating means includes circuit means for comparing the outputs of different series circuits with one another.

9. An apparatus as defined in claim 8 wherein said spots form a pair of parallel rows, said cells being arrayed in two groups each aligned with one of said rows, the cells of each group being serially interconnected for comparison of their output with that of the other group by said circuit means.

10. An apparatus as defined in claim 3 wherein said cells are subdivided into groups of juxtaposed cells each extending over only a fraction of the width of said path, the cells of each group being interconnected in a respective series circuit, said defect-indicating means comprising first circuit means for comparing the outputs of different series circuits of nonadjacent groups with each other and second circuit means for comparing an output voltage from at least one of said series circuits with a predetermined reference potential.

11. An apparatus as defined in claim 10 wherein said first circuit means is provided with an input circuit discriminating against low-frequency pulses.

12. An apparatus as defined in claim 3 wherein said cells include a first set of cells disposed on the side of the incident rays for illumination by reflection from the sheet material and a second set of cells disposed on the opposite side for translumination through the sheet material.

13. An apparatus as defined in claim 12 wherein said light-source means comprises a linear array of first emitters and a linear array of second emitters juxtaposed with said first emitters, said first emitters being adapted to produce rays of a relatively short wavelength for reflection by the sheet material, said second emitters being adapted to produce rays of a relatively long wavelength for translumination of the sheet material.

14. An apparatus for detecting optically ascertainable imperfections on sheet material, comprising light-source means adapted to produce a flat bundle of light rays across a path of sheet material to be tested, feed means for advancing said sheet material along said path with interception of said bundle by successive sheet portions, light-receiving means disposed along a line transverse to said path for illumination by unabsorbed light rays of the intercepted bundle, masking means movably positioned between said light-source means and said light-receiving means for confining said unabsorbed rays to a multiplicity of small spots lying in at least one row across said path, drive means for continuously moving said masking means across said path at a rate related to the speed of said sheet material by a ratio substantially corresponding to the ratio of the separation between adjoining spots to the width of said spots whereby the entire sheet surface is scanned by light rays directed toward said light-receiving means, and defect-indicating means responsive to the output of said light-receiving means.

15. An apparatus for detecting optically ascertainable imperfections on sheet material, comprising light-source means adapted to produce a flat bundle of light rays across a path of sheet material to be tested, feed means for advancing said sheet material along said path with interception of said bundle by successive sheet portions, light-receiving means disposed along a line transverse to said path for illumination by unabsorbed light rays of the intercepted bundle, masking means movably positioned between said light-source means and said light-receiving means for confining said unabsorbed rays to a multiplicity of small spots lying in at least one row across said path, drive means for continuously moving said masking means across said path at a rate related to the speed of said sheet material by a ratio substantially corresponding to the ratio of the separation between adjoining spots to the width of said spots whereby the entire sheet surface is scanned by light rays directed toward said light-receiving means, and defect-indicating means responsive to the output of said light-receiving means, said masking means comprising a perforated endless band.

16. An apparatus as defined in claim 15 wherein the perforations of said band are disposed in staggered relationship in two parallel rows extending the length of said band.

17. An apparatus as defined in claim 15 wherein said band encircles said sheet material, said light-source means comprising two sets of light sources positioned to illuminate opposite sides of said sheet material through respective reaches of said band.

18. An apparatus as defined in claim 15, further comprising fixed support means separating said band from said sheet material, said support means being provided with an elongated channel aligned with the perforations of said band and accommodating said light-receiving means.

19. An apparatus for detecting optically ascertainable imperfections on sheet material, comprising a linear light source adapted to direct a flat bundle of light rays onto sheet material to be tested, feed means for advancing said sheet material along a path transverse to said light source with interception of said bundle by successive sheet portions, light-receiving means disposed along a line transverse to said path and parallel to said light source for illumination by unabsorbed light rays of the intercepted bundle, an endless perforated band disposed between said light source and said sheet material for confining the rays of said bundle to a multiplicity of small spots lying in at least one row across said path, drive means for continuously displacing said band in a manner sweeping said spots with invariable relative spacing across said path at a rate related to the speed of said sheet material by a ratio substantially corresponding to the ratio of the separation between adjoining spots to the width of said spots whereby the entire sheet surface is scanned by light rays directed toward said light-receiving means, and defect-indicating means responsive to the output of said light-receiving means.

References Cited

UNITED STATES PATENTS

| | | | |
|---|---|---|---|
| 2,719,235 | 9/1955 | Emerson | 250—219 |
| 3,001,080 | 9/1961 | Neil | 250—219 |
| 3,188,478 | 6/1965 | Binks | 250—219 |
| 3,206,606 | 7/1965 | Bargo et al. | 250—235 X |

RALPH G. NILSON, *Primary Examiner.*

J. D. WALL, *Assistant Examiner.*